US012234977B2

(12) United States Patent
Chen et al.

(10) Patent No.: US 12,234,977 B2
(45) Date of Patent: Feb. 25, 2025

(54) FLAME RETARDANT LAMP

(71) Applicant: POWER ON TOOLS CO., LTD, Xiamen (CN)

(72) Inventors: Xun Chen, Xiamen (CN); Zhangxun Weng, Xiamen (CN); Xia Li, Xiamen (CN); Yvbing Zhu, Xiamen (CN); Kongjing Lin, Xiamen (CN); William Joseph Tadda, Jr., Kenosha, WI (US)

(73) Assignee: POWER ON TOOLS CO., LTD, Xiamen (CN)

( * ) Notice: Subject to any disclaimer, the term of this patent is extended or adjusted under 35 U.S.C. 154(b) by 230 days.

(21) Appl. No.: 18/193,646

(22) Filed: Mar. 31, 2023

(65) Prior Publication Data

US 2023/0400177 A1 Dec. 14, 2023

(30) Foreign Application Priority Data

Jun. 8, 2022 (CN) ......................... 202210640159.4

(51) Int. Cl.

| | |
|---|---|
| ***H05B 45/10*** | (2020.01) |
| ***F21V 23/04*** | (2006.01) |
| ***F21V 25/10*** | (2006.01) |
| ***F21V 25/12*** | (2006.01) |
| ***F21V 33/00*** | (2006.01) |
| ***H05B 45/18*** | (2020.01) |
| ***H05B 45/30*** | (2020.01) |
| ***H05B 45/56*** | (2020.01) |
| ***H05B 47/28*** | (2020.01) |

(52) U.S. Cl.

CPC .......... *F21V 25/10* (2013.01); *F21V 23/0457* (2013.01); *F21V 25/12* (2013.01); *F21V 33/0076* (2013.01); *H05B 45/18* (2020.01); *H05B 45/30* (2020.01); *H05B 45/56* (2020.01); *H05B 47/28* (2020.01)

(58) Field of Classification Search

CPC ........ H05B 45/10; H05B 45/18; H05B 45/30; H05B 45/50; H05B 45/56; H05B 47/20; H05B 47/28; F21V 23/0457; F21V 25/10; F21V 25/12; F21V 33/0076

See application file for complete search history.

(56) References Cited

U.S. PATENT DOCUMENTS

2010/0315004 A1* 12/2010 Horng .................... H05B 45/56 315/117
2013/0033180 A1* 2/2013 Horng .................... H05B 45/00 315/112

* cited by examiner

*Primary Examiner* — Long Nguyen

(57) ABSTRACT

A flame retardant lamp includes a lamp body, a printed circuit board (PCB), a power supply, a light-emitting plate, a controller, a driving circuit, and a first temperature sensor. The PCB, the power supply, and the light-emitting plate are disposed inside the lamp body, the controller and the driving circuit are disposed on the PCB, and the first temperature sensor is disposed on the light-emitting plate. The controller is electrically connected to the light-emitting plate through the driving circuit, the first temperature sensor is electrically connected to an input end of the controller, and the power supply is electrically connected to a power supply end of the PCB.

10 Claims, 7 Drawing Sheets

FLAME RETARDANT LAMP

TECHNICAL FIELD

The present disclosure relates to a field of lamps, and in particular to a flame retardant lamp.

BACKGROUND

During a working period of lamps, a light source portion of the lamps generates a large amount of heat, and when a light source is not covered, the heat may be automatically dissipated. However, when the lamps are tilted or there is foreign matter at the light source portion of the lamps, the light source is covered, so that the heat of the light source portion cannot be dissipated, and temperature at the light source is rapidly increased. Covering the light source for a long time may damage the lamps. When a covering is a flammable substance, heating for a long time may further cause the covering in phenomena such as carbonization, baking, burning, and so on, resulting in occurrence of safety accidents, and even a fire.

Based on above, the present disclosure provides a flame retardant lamp.

SUMMARY

The present disclosure provides a flame retardant lamp, aiming at solving a problem that when a light source of current lamps is covered, a heat of a light source portion cannot be dissipated, and a fire may be caused.

The present disclosure provides the flame retardant lamp, including a lamp body, a printed circuit board (PCB), a power supply, a light-emitting plate, a controller, a driving circuit, and a first temperature sensor. The PCB, the power supply, and the light-emitting plate are disposed inside the lamp body, the controller and the driving circuit are disposed on the PCB, and the first temperature sensor is disposed on the light-emitting plate. The controller is electrically connected to the light-emitting plate through the driving circuit, the first temperature sensor is electrically connected to an input end of the controller, and the power supply is electrically connected to a power supply end of the PCB. The controller is configured to execute a computer program stored therein to execute following steps:

- obtaining a temperature value of the light-emitting plate through the first temperature sensor at every preset time period;
- comparing a first temperature value of the light-emitting plate at a first current moment with a second temperature value of the light-emitting plate at a first last moment, and generating a first comparison result; and
- when determining that a light-transmitting surface of the lamp body is covered according to the first comparison result, controlling the driving circuit to stop driving, and then turning off the light-emitting plate.

Optionally, a step of when determining that the light-transmitting surface of the lamp body is covered according to the first comparison result, controlling the driving circuit to stop driving, and then turning off the light-emitting plate is as follows:

- when determining that a difference between the first temperature value of the light-emitting plate at the first current moment and the second temperature value of the light-emitting plate at the first last moment is greater that a first preset threshold or a change rate between the first temperature value of the light-emitting plate at the first current moment and the second temperature value of the light-emitting plate at the first last moment is greater than a second preset threshold according to the first comparison result, determining that that the light-transmitting surface of the lamp body is covered, controlling the driving circuit to stop driving, and then turning off the light-emitting plate.

Optionally, the flame retardant lamp further includes a second temperature sensor, and the second temperature sensor is disposed on the PCB. The second temperature sensor is electrically connected to an output end of the controller.

Optionally, the controller further executes following steps:

- obtaining a temperature value inside the lamp body through the second temperature sensor; and
- when determining that the temperature value inside the lamp body is greater than a third preset threshold, controlling the driving circuit to stop driving, and then turning off the light-emitting plate.

Optionally, the flame retardant lamp further includes a key module, the key module is disposed on an outer portion of the lamp body, and the key module is electrically connected to the input end of the controller.

Optionally, the flame retardant lamp further includes a voltage sampling circuit. An input end of the voltage sampling circuit is electrically connected to the power supply, and an output end of the voltage sampling circuit is electrically connected to the input end of the controller.

Optionally, the flame retardant lamp further includes an indicator light module, and the indicator light module is disposed on the outer portion of the lamp body. The indicator lamp module is electrically connected to an output end of the controller.

Optionally, the controller further executes following steps:

- when detecting a startup request through the key module, obtaining a voltage value of a battery through the voltage sampling circuit;
- when determining that the voltage value of the battery is greater than a preset value, controlling the driving circuit to turn on the light-emitting plate; and
- when determining that the voltage value of battery is less than the preset value, controlling the light-emitting plate to be in an off state, and displaying a current voltage of the battery through the indicator light module.

Optionally, the flame retardant lamp further includes a third temperature sensor, the third temperature sensor is disposed on an inner wall of the light-transmitting surface of the lamp body, and the third temperature sensor is electrically connected to the input end of the controller. The controller further executes following steps:

- obtaining a temperature value at the light-transmitting surface of the lamp body through the third temperature sensor at every preset time period;
- comparing a first temperature value at the light-transmitting surface of the lamp body at a second current moment with a second temperature value at the light-transmitting surface of the lamp body at a second last moment, and generating a second comparison result; and
- when determining that a difference between the first temperature value of the light-transmitting surface of the lamp body at the second current moment and the second temperature value of the light-transmitting surface of the lamp body at the second last moment is greater than the first preset threshold or a change rate between the first temperature value of the light-transmitting surface of the lamp body at the second current moment and the second temperature value of the light-transmitting surface of the lamp body at the second last moment is greater than the second preset threshold according to the second comparison result, controlling the driving circuit to stop driving, and then turning off the light-emitting plate.

Optionally, the flame retardant lamp further includes a fourth temperature sensor and a fifth temperature sensor, the fourth temperature sensor is disposed on an inner wall of the light-transmitting surface of the lamp body, and the fifth temperature sensor is disposed on the lamp body and is distal from the light-transmitting surface of the lamp body, both the fourth temperature sensor and the fifth temperature sensor are electrically connected to the input end of the controller. The controller further executes following steps:

- obtaining a temperature value at the light-transmitting surface of the lamp body through the fourth temperature sensor and obtaining a temperature value of an outer side of the lamp body through the fifth temperature sensor at every preset time period;
- comparing a first temperature value at the light-transmitting surface of the lamp body at a second current moment with a second temperature value at the light-transmitting surface of the lamp body at a second last moment to obtain a first temperature change condition at the light-transmitting surface of the lamp body at the second current moment, where the first temperature change condition is a temperature change value or a change rate of temperature values;
- comparing a first temperature value of the outer side of the lamp body at a third current moment with a second temperature value of the outer side of the lamp body at a third last moment to obtain a second temperature change condition at the outer side of the lamp body at the third current moment;
- when the first temperature change condition is greater than a third preset threshold and the second temperature change condition is less than or equal to the third preset threshold, turning off the light-emitting plate; and
- when both the first temperature change condition and the second temperature change condition are greater than the third preset threshold, controlling the light-emitting plate to work on.

The present disclosure provides the flame retardant lamp, the controller obtains the temperature value of the light-emitting plate through the first temperature sensor at every preset time period, when detecting that the difference between the first temperature value of the light-emitting plate at the first current moment and the second temperature value of the light-emitting plate at the first last moment is greater that the first preset threshold, the light-transmitting surface of the lamp body is determined to be covered. Meanwhile, the controller controls the driving circuit to stop driving, thereby turning off the light-emitting plate to avoid further heating the lamp to damage the lamp and also avoid phenomena of carbonization, baking, and burning of coverings on the lamp body caused by high temperatures.

DETAILED DESCRIPTION OF EMBODIMENTS

Figure 1:
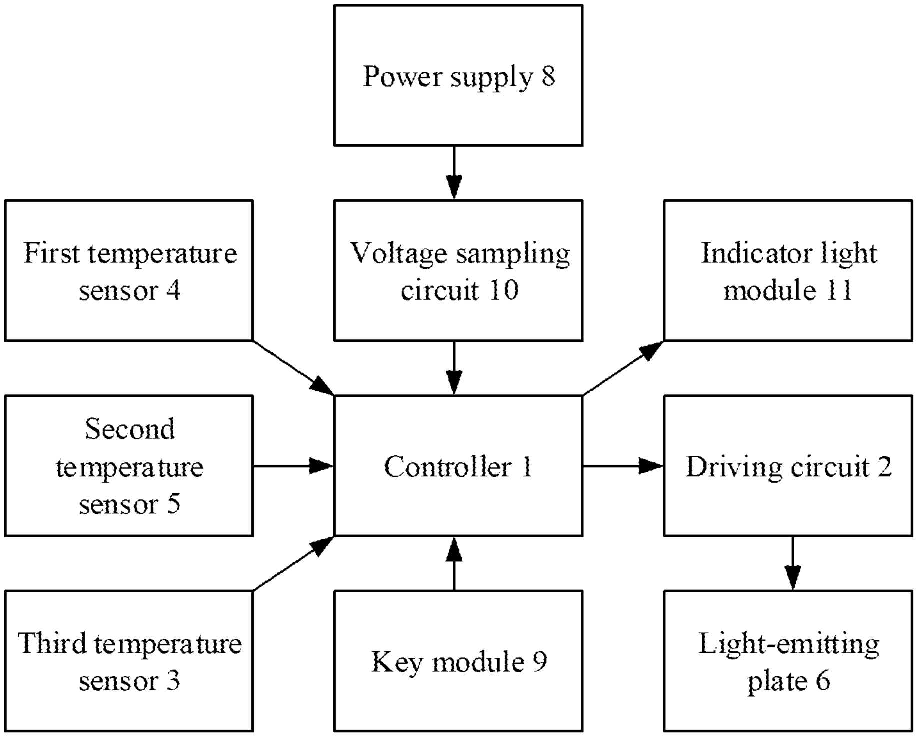
FIG. 1 is a block schematic diagram of a flame retardant lamp according to one embodiment of the present disclosure.
Figure 2:
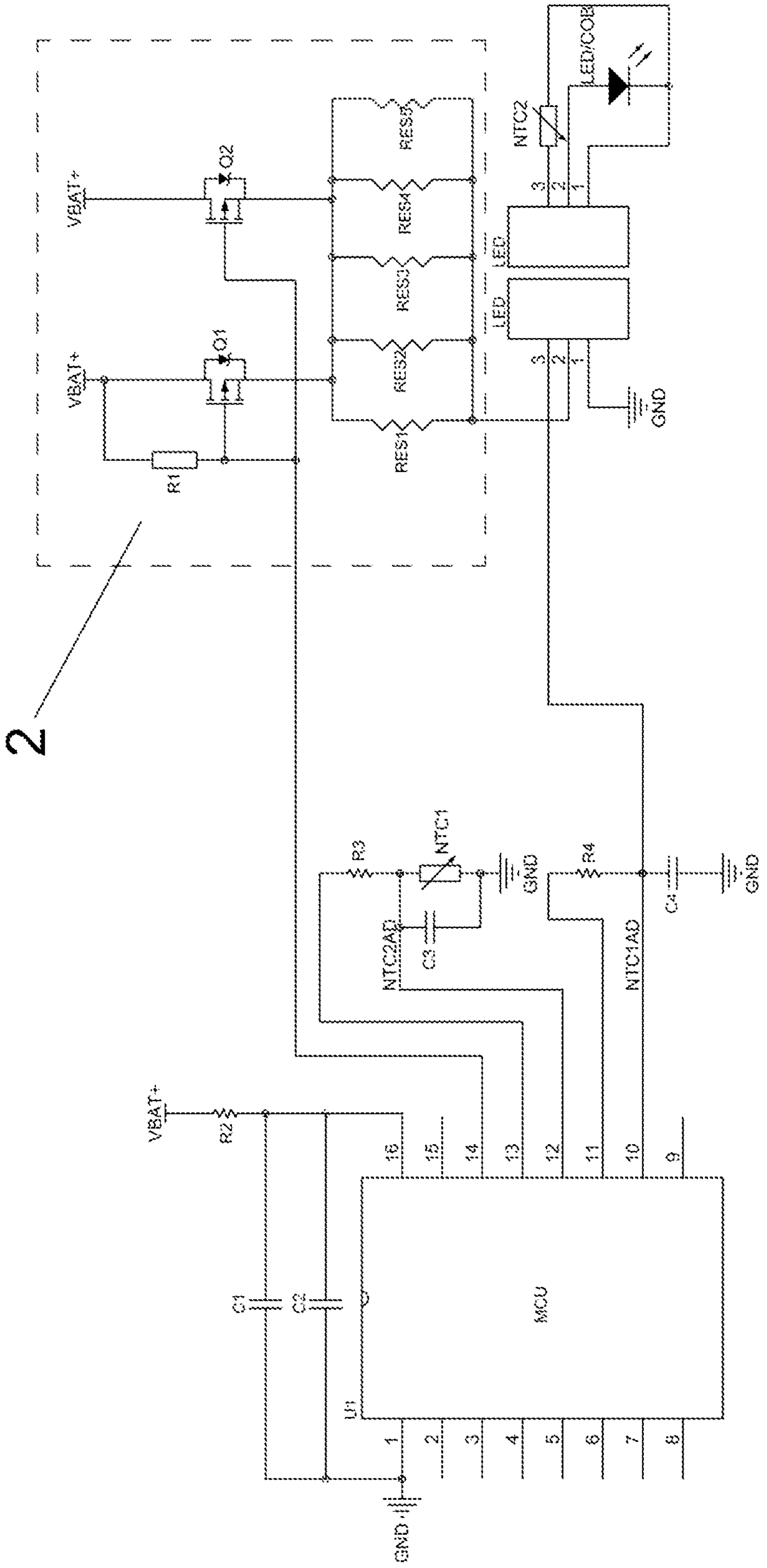
FIG. 2 is a circuit schematic diagram of the flame retardant lamp according to one embodiment of the present disclosure.
Figure 3:
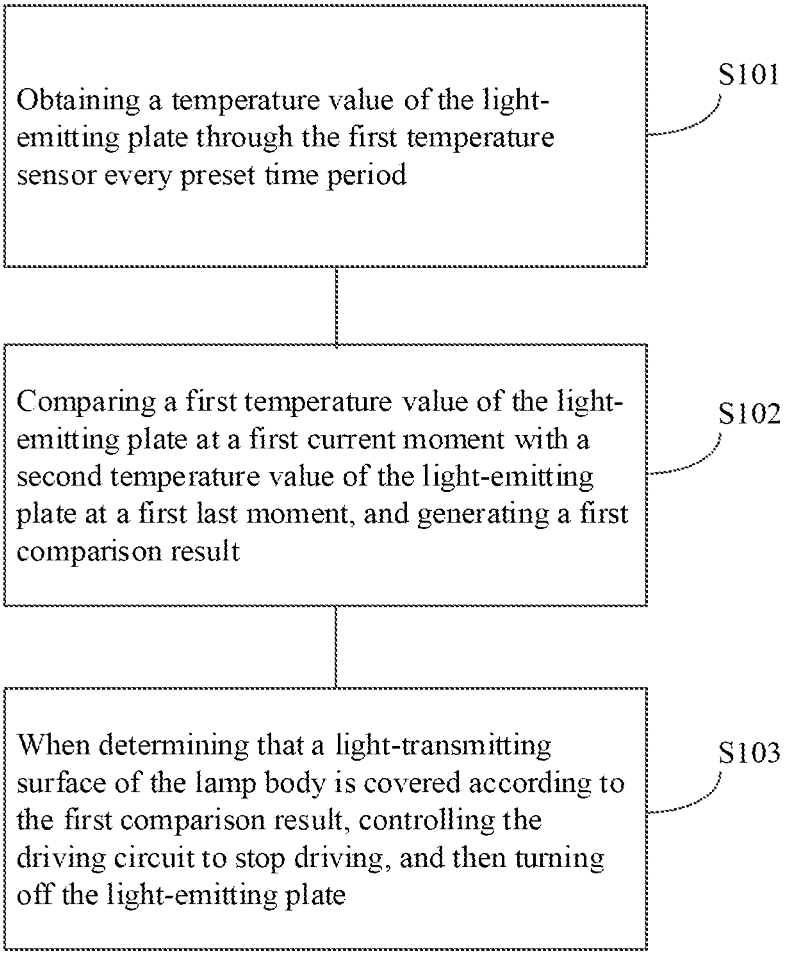
FIG. 3 is a flowchart of executing steps of a controller according to one embodiment of the present disclosure.
Figure 4:
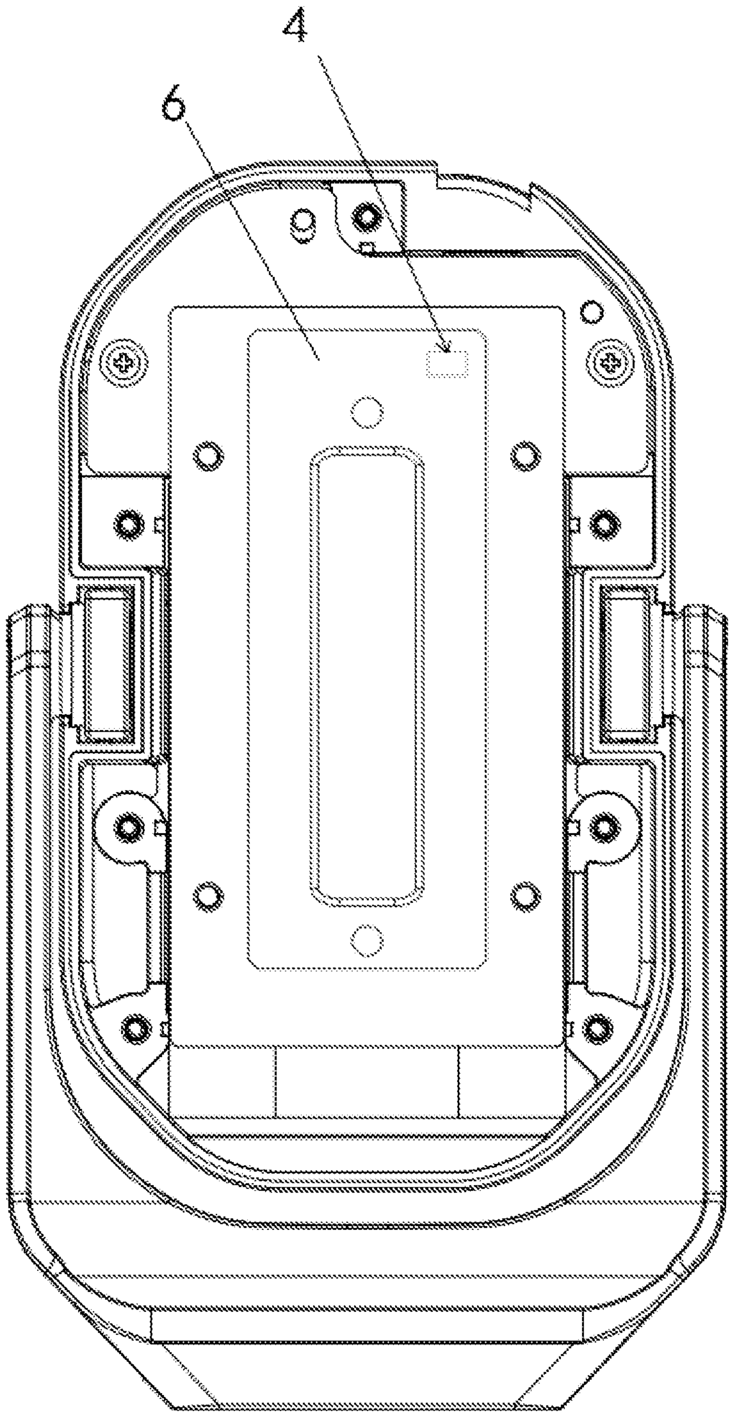
FIG. 4 is a schematic diagram of a first temperature sensor disposing on a light-emitting plate according to one embodiment of the present disclosure.
Figure 5:
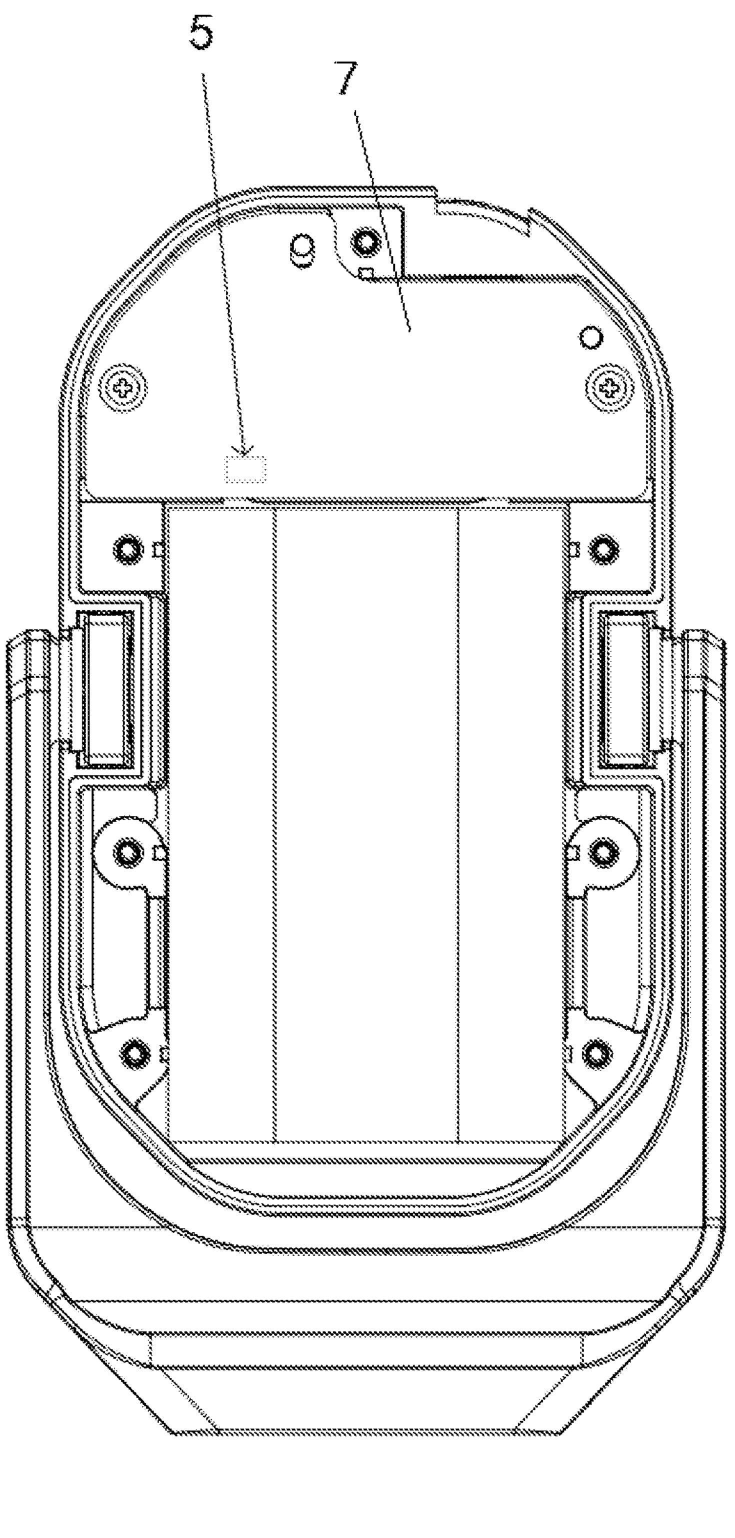
FIG. 5 is a schematic diagram of a second temperature sensor disposing on a PCB according to one embodiment of the present disclosure.
Figure 6:
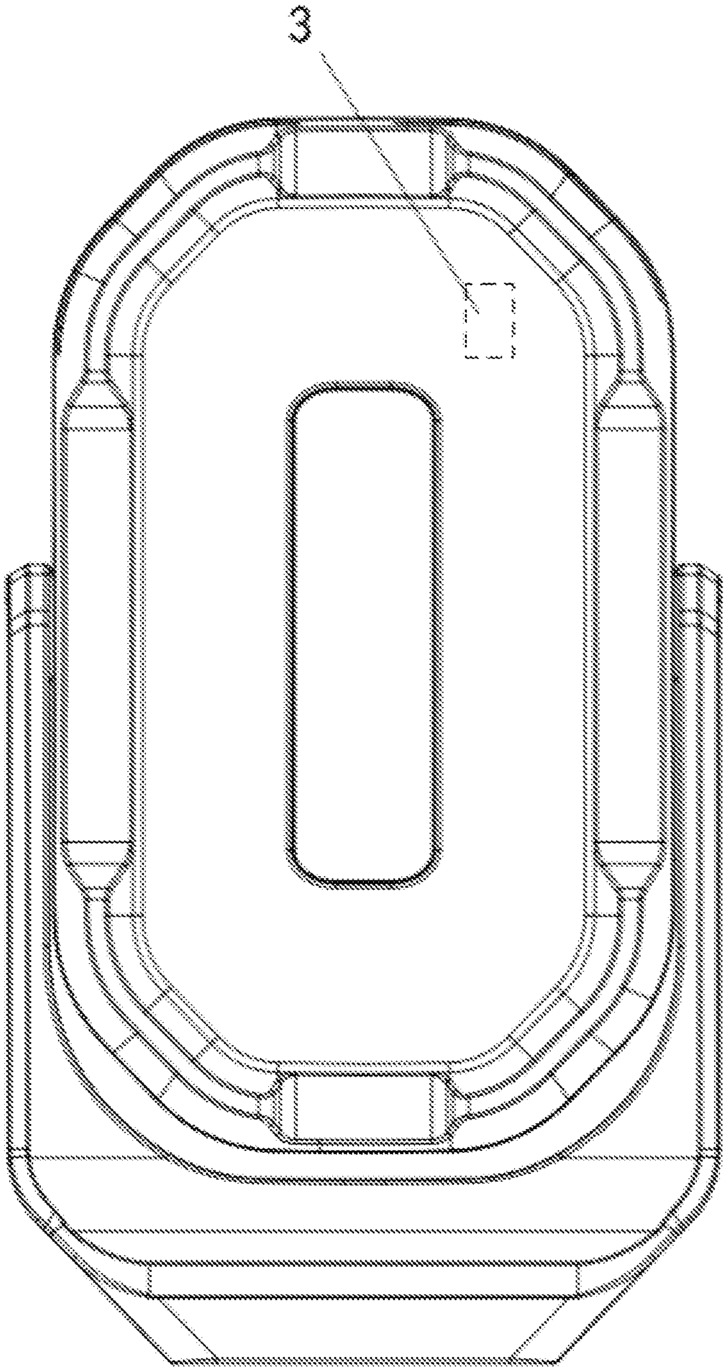
FIG. 6 is a schematic diagram of a third temperature sensor disposing on a light-transmitting surface of a lamp body according to one embodiment of the present disclosure.

In order to make the objectives, technical solutions, and advantages of embodiments of the present disclosure clearer, the technical solutions in the embodiments of the present disclosure will be clearly and completely described below with reference to accompanying drawings in the embodiments of the present disclosure. Obviously, the described embodiments are some embodiments of the present disclosure, rather than all of the embodiments. All other embodiments obtained by a person of ordinary skill in the art based on the embodiments of the present disclosure without creative efforts shall fall within a protection scope of the present disclosure. Therefore, the following detailed description of the embodiments of the present disclosure provided in the drawings is not intended to limit the protection scope of the present disclosure, but is merely representative of selected embodiments of the present disclosure. All other embodiments obtained by a person of ordinary skill in the art based on the embodiments of the present disclosure without creative efforts shall fall within the protection scope of the present disclosure.

Specific embodiments of the present disclosure are described in detail below with reference to the accompanying drawings.

The present disclosure provides a flame retardant lamp, aiming at solving a problem that when a light source of current lamps is covered, a heat of a light source portion cannot be dissipated, and a fire may be caused.

As shown in FIGS. 1-6, The present disclosure provides the flame retardant lamp, including a lamp body, a printed circuit board (PCB) 7, a power supply 8, a light-emitting plate 6, a controller 1, a driving circuit 2, and a first temperature sensor 4. The PCB 7, the power supply 8, and the light-emitting plate 6 are disposed inside the lamp body, the controller 1 and the driving circuit 2 are disposed on the PCB 7, and the first temperature sensor 4 is disposed on the light-emitting plate 6. The controller 1 is electrically connected to the light-emitting plate 6 through the driving circuit 2, the first temperature sensor 4 is electrically connected to an input end of the controller 1, and the power supply 8 is electrically connected to a power supply end of the PCB 7. The controller 1 is configured to execute a computer program stored therein to execute following steps:

- obtaining a temperature value of the light-emitting plate 6 through the first temperature sensor 4 at every preset time period;

comparing a first temperature value of the light-emitting plate 6 at a first current moment with a second temperature value of the light-emitting plate 6 at a first last moment, and generating a first comparison result; and when determining that a light-transmitting surface of the lamp body is covered according to the first comparison result, controlling the driving circuit 2 to stop driving, and then turning off the light-emitting plate 6.

It should be noted that the inventor finds that for some small lamps and small working lamps, when forgetting to turn off the small lamps and the small working lamps after using and casually placing the small lamps and the small working lamps on tables or other items, or light outlets of which are covered to further cover light source, a problem that the lamps are rapidly heated and temperatures of which cannot be dissipated is caused, thereby damaging the lamps. In addition, high temperatures of the lamps may cause phenomena of carbonization, baking, and burning of coverings on the lamp body.

In one embodiment, the power supply 8 is configured to charge a lamp main body disposed on the light-emitting plate 6 and the controller 1, and the power supply 8 may be a rechargeable battery or other types of batteries. The controller 1 obtains the temperature value of the light-emitting plate 6 through the first temperature sensor 4 at every preset time period. In one embodiment, the temperature value of the light-emitting plate 6 is obtained at every preset time period, for example, every two minutes or five minutes, and the first temperature value of the light-emitting plate 6 at the first current moment is compared with the second temperature value of the light-emitting plate 6 at the first last moment to determine that whether the light-transmitting surface of the lamp body is covered or not, when determining that the light-transmitting surface of the lamp body is covered, the controller 1 controls the driving circuit 3 to stop driving, thereby turning off the light-emitting plate 6. Specifically, in one embodiment, when determining that a difference between the first temperature value of the light-emitting plate 6 at the first current moment and the second temperature value of the light-emitting plate 6 at the first last moment is greater that a first preset threshold or a change rate between the first temperature value of the light-emitting plate 6 at the first current moment and the second temperature value of the light-emitting plate 6 at the first last moment is greater than a second preset threshold according to the first comparison result, the temperature value of the light-emitting plate 6 is obtained every five minutes, when a time axis is at ten minutes, the temperature value of the light-emitting plate 6 is 50° C., when a time axis is at five minutes, the temperature value of the light-emitting plate 6 is 40° C., and the first preset threshold which is a preset temperature rise is 3° C., the difference thereof of greater than the preset temperature rise, thereby determining that the light-transmitting surface of the lamp body is covered, and the controller 1 turns off the light-emitting plate 6 through the driving circuit 2, thereby turning off the lamp main body disposed on the light-emitting plate 6.

In one embodiment, the flame retardant lamp further includes a second temperature sensor 5, and the second temperature sensor 5 is disposed on the PCB 7. The second temperature sensor 5 is electrically connected to an output end of the controller 1.

It should be noted that the second temperature sensor 5 is configured to obtain a temperature value inside the lamp body, and the temperature value inside the lamp body is further configured to determine that whether the light-transmitting surface of the lamp body is covered or not, when the light-transmitting surface of the lamp body is covered, the temperature value inside the lamp body may also rapidly rise. In other embodiments, the second temperature sensor 5 is further configured to be disposed on other positions, which is not specifically limited herein, but these solutions are all within the protection scope of the present disclosure.

In one embodiment, the controller 1 further executes following steps:

obtaining the temperature value inside the lamp body through the second temperature sensor 5; and when determining that the temperature value inside the lamp body is greater than a third preset threshold, controlling the driving circuit 2 to stop driving, and then turning off the light-emitting plate 6.

Specifically, due to a fact that whether the lamp body is covered or not is determined at every preset time period through the first temperature sensor 4 disposed on the light-emitting plate 6, if a time period of a determining program at the beginning is too long, for example, every thirty minutes to obtain the temperature value once, and if the lamp body is covered at first five mites of a last moment of obtaining, then there may be a situation that a difference between a temperature value at the last moment and a temperature value at a moment before the last moment is less than the first present threshold, at this time, the light-emitting plate 6 cannot be triggered to turn off, so that if the lamp body is covered in thirty-five minutes, a temperature of the lamp body may be too high, or the coverings on the lamp body may be ignited. Thus, in the embodiment, when the second temperature sensor 5 detects the temperature value inside the lamp body is greater than the third preset threshold, the driving circuit 2 needs to be timely controlled to stop driving, thereby turning off the light-emitting plate 6.

In one embodiment, the flame retardant lamp further includes a key module 9, the key module 9 is disposed on an outer portion of the lamp body, and the key module 9 is electrically connected to the input end of the controller 1.

It should be noted that the key module 9 is configured to control the lamp body to be turned on or off, certainly, in other embodiments, other control manners may be used to turn on or off the lamp body, for example, a voice module, which is not specifically limited herein, but these solutions are all within the protection scope of the present disclosure.

In one embodiment, the flame retardant lamp further includes a voltage sampling circuit 10. An input end of the voltage sampling circuit 10 is electrically connected to the power supply 8, and an output end of the voltage sampling circuit 10 is electrically connected to the input end of the controller 1.

It should be noted that the voltage sampling circuit 10 is configured to obtain power of the power supply 8 in real time, and transmit the power to the controller 1 in real time.

In one embodiment, the flame retardant lamp further includes an indicator light module 11, and the indicator light module 11 is disposed on the outer portion of the lamp body. The indicator lamp module 11 is electrically connected to an output end of the controller 1.

It should be noted that the indicator light module 11 is configured to indicate the power of the power supply 8, and the indicator light module may include one or more LED lamp bodies, which may indicate the power of the power supply 8 by changing colors of the one or more LED lamp bodies, or may indicate the power of the power source 8 through lighting different numbers of the LED lamp bodies, and these solutions may be correspondingly selected according to actual conditions, which are not specifically limited herein, but these solutions are all within the protection scope of the present disclosure.

In one embodiment, the controller 1 further executes following steps:

when detecting a startup request through the key module 9, obtaining a voltage value of a battery through the voltage sampling circuit 10;

when determining that the voltage value of the battery is greater than a preset value, controlling the driving circuit 2 to turn on the light-emitting plate 6; and when determining that the voltage value of battery is less than the preset value, controlling the light-emitting plate 6 to be in an off state, and displaying a current voltage of the battery through the indicator light module 11.

It should be noted that, in the embodiment, the voltage value of the power supply 8 is obtained through the voltage sampling circuit 10, and when the voltage value of the power supply 8 is less than the preset value, the lamp main body on the light emitting plate 6 is limited to not be turned on, which avoids the power supply 8 from excessive discharge to be damaged.

In one embodiment, the flame retardant lamp further includes a third temperature sensor 3, the third temperature sensor 3 is disposed on an inner wall of the light-transmitting surface of the lamp body, and the third temperature sensor 3 is electrically connected to the input end of the controller 1.

It should be noted that the third temperature sensor 3 is configured to be disposed on the inner surface of the light-transmitting surface of the lamp body, and in other embodiments, the third temperature sensor 3 may also be disposed on other positions of a housing of the lamp body, details are not specifically limited herein, but these solutions are all within the protection scope of the present disclosure.

In one embodiment, the controller 1 further executes following steps:

obtaining a temperature value at the light-transmitting surface of the lamp body through the third temperature sensor 3 at every preset time period;

comparing a first temperature value at the light-transmitting surface of the lamp body at a second current moment with a second temperature value at the light-transmitting surface of the lamp body at a second last moment, and generating a second comparison result; and when determining that a difference between the first temperature value of the light-transmitting surface of the lamp body at the second current moment and the second temperature value of the light-transmitting surface of the lamp body at the second last moment is greater than the first preset threshold or a change rate between the first temperature value of the light-transmitting surface of the lamp body at the second current moment and the second temperature value of the light-transmitting surface of the lamp body at the second last moment is greater than the second preset threshold according to the second comparison result, controlling the driving circuit 2 to stop driving, and then turning off the light-emitting plate 6.

It should be noted that the inventor further finds that the light-transmitting surface of the lamp body is a surface which is in direct contact with the coverings, and changes of temperature rise of the light-transmitting surface of the lamp body are the most obvious when the light-transmitting surface of the lamp body is covered. Specifically, an obtaining period interval of the third temperature sensor 3 disposed on the housing may be less than an obtaining period interval of the first temperature sensor 4 disposed on a light-emitting sensor. Certainly, in other embodiments, obtaining period intervals may be the same and there are different starting points. For example, the third temperature sensor 3 begins to obtain the temperature value at the light-transmitting surface of the lamp body after the light-emitting plate 6 is turned on for five minutes, while the first temperature sensor 4 disposed on the light-emitting plate 6 begins to obtain the temperature value of the light-emitting plate 6 after the light-emitting plate 6 is turned on for three minutes. The third temperature sensor 3 is disposed on the housing, so that whether the light-transmitting surface of the lamp body is covered or not is rapidly determined.

The present disclosure provides the flame retardant lamp, the controller 1 obtains the temperature value of the light-emitting plate 6 through the first temperature sensor 4 at every preset time period, when detecting that the difference between the first temperature value of the light-emitting plate 6 at the first current moment and the second temperature value of the light-emitting plate 6 at the first last moment is greater that the first preset threshold, the light-transmitting surface of the lamp body is determined to be covered. Meanwhile, the controller 1 controls the driving circuit 2 to stop driving, thereby turning off the light-emitting plate 6 to avoid further heating the lamp to damage the lamp and also avoid phenomena of carbonization, baking, and burning of coverings on the lamp body caused by high temperatures.

Figure 7:
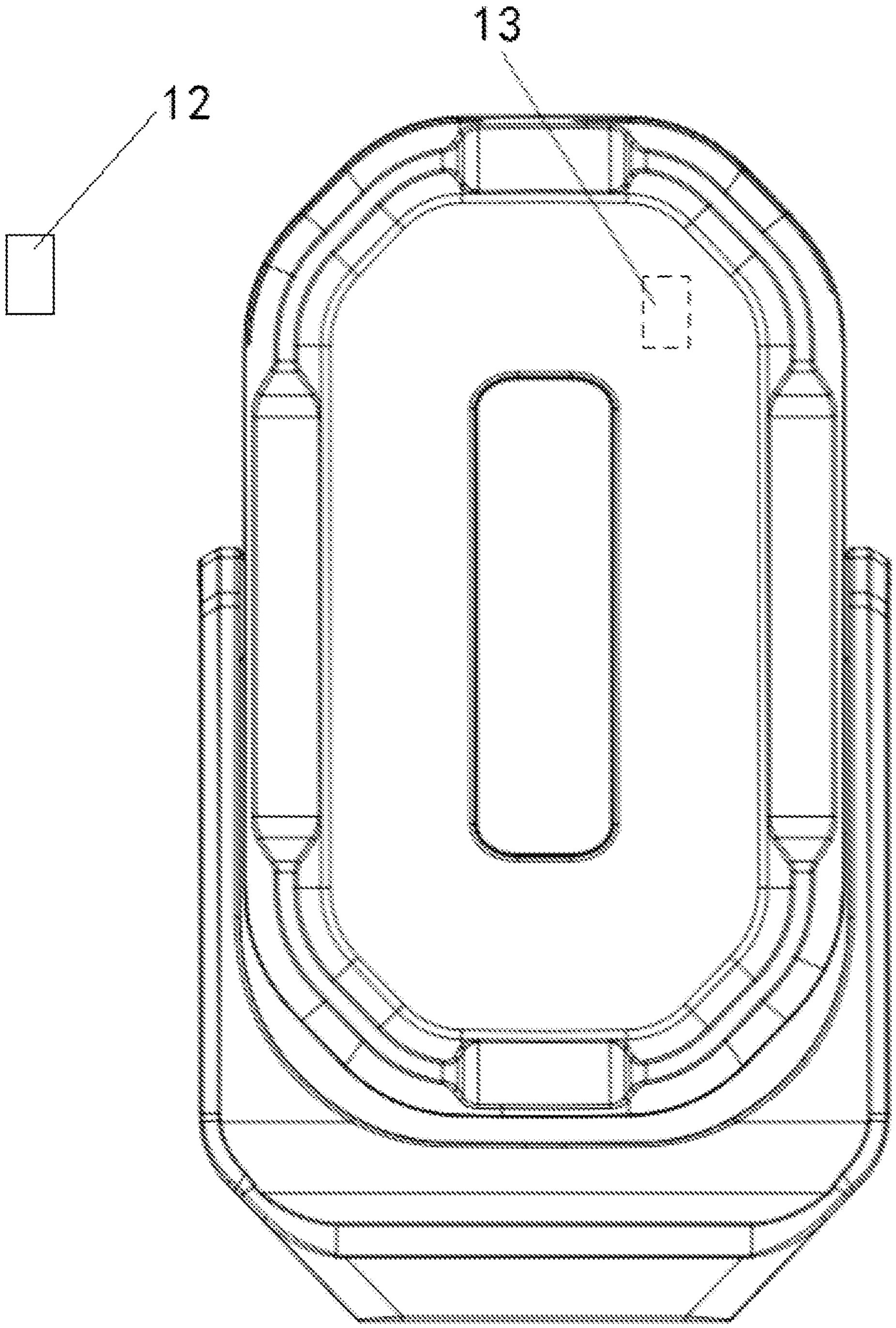
FIG. 7 is a schematic diagram of a position where a fourth temperature sensor and a fifth temperature sensor are disposed according to one embodiment of the present disclosure.

As shown in FIG. 7, the flame retardant lamp further includes a fourth temperature sensor 13 and a fifth temperature sensor 12, the fourth temperature sensor 13 is disposed on an inner wall of the light-transmitting surface of the lamp body, and the fifth temperature sensor 12 is disposed on the lamp body and is distal from the light-transmitting surface of the lamp body, both the fourth temperature sensor 13 and the fifth temperature sensor 12 are electrically connected to the input end of the controller 1. The controller 1 further executes following steps:

obtaining a temperature value at the light-transmitting surface of the lamp body through the fourth temperature sensor 13 and obtaining a temperature value of an outer side of the lamp body through the fifth temperature sensor 12 at every preset time period;

comparing a first temperature value at the light-transmitting surface of the lamp body at a second current moment with a second temperature value at the light-transmitting surface of the lamp body at a second last moment to obtain a first temperature change condition at the light-transmitting surface of the lamp body at the second current moment, where the first temperature change condition is a temperature change value or a change rate of temperature values;

comparing a first temperature value of the outer side of the lamp body at a third current moment with a second temperature value of the outer side of the lamp body at a third last moment to obtain a second temperature change condition at the outer side of the lamp body at the third current moment;

when the first temperature change condition is greater than a third preset threshold and the second temperature change condition is less than or equal to the third preset threshold, turning off the light-emitting plate 6; and when both the first temperature change condition and the second temperature change condition are greater than the third preset threshold, controlling the light-emitting plate 6 to work on.

In the embodiment, the fourth temperature sensor 13 is configured to determine temperature changes at the light-transmitting surface of the lamp body to further determine whether the light-transmitting surface of the lamp body is covered. However, the reason for change in temperature at the light transmitting surface of the lamp body may not only be due to being covered, for example, when a lamp is in a relatively hot environment, it is also possible to cause a large temperature change value or a large change rate of temperature values at the light transmitting surface of the lamp body, at this time, the lamp should not be turned off.

Thus, in the embodiment, the fifth temperature sensor 12 is further disposed on the lamp body and is distal from the light-transmitting surface of the lamp body. The fifth temperature sensor 12 is configured to obtain a temperature value of an environment where the lamp is placed. In this way, according to a change trend of the fourth temperature sensor 13 and a change trend of the fifth temperature sensor 12, it can be determined that a temperature change obtained through the fourth temperature sensor 13 is caused by the environment or due to a fact that the light-transmitting surface of the lamp body is covered by the coverings, thereby avoiding a trouble brought that the lamp suddenly turns off in an inappropriate scenario to users.

The above are only preferred embodiments of the present disclosure, and the protection scope of the present disclosure is not limited to the above-mentioned embodiments, and all technical solutions that belong to the idea of the present disclosure belong to the protection scope of the present disclosure.

What is claimed is:

1. A flame retardant lamp, comprising:

a lamp body;

a printed circuit board (PCB);

a power supply;

a light-emitting plate;

a controller;

a driving circuit; and a first temperature sensor;

wherein the PCB, the power supply, and the light-emitting plate are disposed inside the lamp body, the controller and the driving circuit are disposed on the PCB, and the first temperature sensor is disposed on the light-emitting plate;

the controller is electrically connected to the light-emitting plate through the driving circuit, the first temperature sensor is electrically connected to an input end of the controller, and the power supply is electrically connected to a power supply end of the PCB;

the controller is configured to execute a computer program stored therein to execute following steps:

obtaining a temperature value of the light-emitting plate through the first temperature sensor at every preset time period;

comparing a first temperature value of the light-emitting plate at a first current moment with a second temperature value of the light-emitting plate at a first last moment, and generating a first comparison result; and when determining that a light-transmitting surface of the lamp body is covered according to the first comparison result, controlling the driving circuit to stop driving, and then turning off the light-emitting plate.

2. The flame retardant lamp according to claim 1, wherein a step of when determining that the light-transmitting surface of the lamp body is covered according to the first comparison result, controlling the driving circuit to stop driving, and then turning off the light-emitting plate is as follows:

when determining that a difference between the first temperature value of the light-emitting plate at the first current moment and the second temperature value of the light-emitting plate at the first last moment is greater that a first preset threshold or a change rate between the first temperature value of the light-emitting plate at the first current moment and the second temperature value of the light-emitting plate at the first last moment is greater than a second preset threshold according to the first comparison result, determining that that the light-transmitting surface of the lamp body is covered, controlling the driving circuit to stop driving, and then turning off the light-emitting plate.

3. The flame retardant lamp according to claim 1, wherein the flame retardant lamp further comprises a second temperature sensor, and the second temperature sensor is disposed on the PCB; the second temperature sensor is electrically connected to an output end of the controller.

4. The flame retardant lamp according to claim 3, wherein the controller further executes following steps:

obtaining a temperature value inside the lamp body through the second temperature sensor; and when determining that the temperature value inside the lamp body is greater than a third preset threshold, controlling the driving circuit to stop driving, and then turning off the light-emitting plate.

5. The flame retardant lamp according to claim 1, wherein the flame retardant lamp further comprises a key module, the key module is disposed on an outer portion of the lamp body, and the key module is electrically connected to the input end of the controller.

6. The flame retardant lamp according to claim 5, wherein the flame retardant lamp further comprises a voltage sampling circuit; an input end of the voltage sampling circuit is electrically connected to the power supply, and an output end of the voltage sampling circuit is electrically connected to the input end of the controller.

7. The flame retardant lamp according to claim 6, wherein the flame retardant lamp further comprises an indicator light module, and the indicator light module is disposed on the outer portion of the lamp body; the indicator lamp module is electrically connected to an output end of the controller.

8. The flame retardant lamp according to claim 7, wherein the controller further executes following steps:

when detecting a startup request through the key module, obtaining a voltage value of a battery through the voltage sampling circuit;

when determining that the voltage value of the battery is greater than a preset value, controlling the driving circuit to turn on the light-emitting plate; and when determining that the voltage value of battery is less than the preset value, controlling the light emitting plate to be in an off state, and displaying a current voltage of the battery through the indicator light module.

9. The flame retardant lamp according to claim 1, wherein the flame retardant lamp further comprises a third temperature sensor, the third temperature sensor is disposed on an inner wall of the light-transmitting surface of the lamp body, and the third temperature sensor is electrically connected to the input end of the controller; the controller further executes following steps:

obtaining a temperature value at the light-transmitting surface of the lamp body through the third temperature sensor at every preset time period;

comparing a first temperature value at the light-transmitting surface of the lamp body at a second current moment with a second temperature value at the light-transmitting surface of the lamp body at a second last moment, and generating a second comparison result; and when determining that a difference between the first temperature value at the light-transmitting surface of the lamp body at the second current moment and the second temperature value at the light-transmitting surface of the lamp body at the second last moment is greater than the first preset threshold or a change rate between the first temperature value at the light-transmitting surface of the lamp body at the second current moment and the second temperature value at the light-transmitting surface of the lamp body at the second last moment is greater than the second preset threshold according to the second comparison result, controlling the driving circuit to stop driving, and then turning off the light-emitting plate.

10. The flame retardant lamp according to claim 1, wherein the flame retardant lamp further comprises a fourth temperature sensor and a fifth temperature sensor, the fourth temperature sensor is disposed on an inner wall of the light-transmitting surface of the lamp body, and the fifth temperature sensor is disposed on the lamp body and is distal from the light-transmitting surface of the lamp body; both the fourth temperature sensor and the fifth temperature sensor are electrically connected to the input end of the controller; and the controller further executes following steps:

obtaining a temperature value at the light-transmitting surface of the lamp body through the fourth temperature sensor and obtaining a temperature value of an outer side of the lamp body through the fifth temperature sensor at every preset time period;

comparing a first temperature value at the light-transmitting surface of the lamp body at a second current moment with a second temperature value at the light-transmitting surface of the lamp body at a second last moment to obtain a first temperature change condition at the light-transmitting surface of the lamp body at the second current moment, where the first temperature change condition is a temperature change value or a change rate of temperature values;

comparing a first temperature value of the outer side of the lamp body at a third current moment with a second temperature value of the outer side of the lamp body at a third last moment to obtain a second temperature change condition at the outer side of the lamp body at the third current moment;

when the first temperature change condition is greater than a third preset threshold and the second temperature change condition is less than or equal to the third preset threshold, turning off the light emitting plate; and when both the first temperature change condition and the second temperature change condition are greater than the third preset threshold, controlling the light emitting plate to work on.

* * * * *